US011787264B2

(12) United States Patent
Lee et al.

(10) Patent No.: US 11,787,264 B2
(45) Date of Patent: Oct. 17, 2023

(54) AIR CONDITIONER FOR VEHICLE

(71) Applicant: Hanon Systems, Daejeon (KR)

(72) Inventors: Nam Jun Lee, Daejeon (KR); Dong Gyun Kim, Daejeon (KR); Si Hyung Kim, Daejeon (KR); Dae Keun Park, Daejeon (KR); Eun Suk Bae, Daejeon (KR); Jun Ho Seo, Daejeon (KR); Ho Lee, Daejeon (KR); Seung Woo Jo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 82 days.

(21) Appl. No.: 17/609,748

(22) PCT Filed: May 20, 2020

(86) PCT No.: PCT/KR2020/006563
§ 371 (c)(1),
(2) Date: Nov. 8, 2021

(87) PCT Pub. No.: WO2020/235922
PCT Pub. Date: Nov. 26, 2020

(65) Prior Publication Data
US 2022/0212520 A1 Jul. 7, 2022

(30) Foreign Application Priority Data

May 21, 2019 (KR) .................. 10-2019-0059243
Feb. 19, 2020 (KR) .................. 10-2020-0020089

(51) Int. Cl.
*B60H 1/00* (2006.01)

(52) U.S. Cl.
CPC ..... *B60H 1/00842* (2013.01); *B60H 1/00521* (2013.01); *B60H 1/00664* (2013.01); *B60H 2001/00092* (2013.01); *B60H 2001/00135* (2013.01)

(58) Field of Classification Search
CPC ............ B60H 1/00842; B60H 1/00521; B60H 1/00664; B60H 1/00692; B60H 1/00021;
(Continued)

(56) References Cited

U.S. PATENT DOCUMENTS 6,021,957 A * 2/2000 Takechi ............. B60H 1/00842
237/12.3 A
2013/0008627 A1 1/2013 Uemura
(Continued)

FOREIGN PATENT DOCUMENTS

DE 102006050320 A1 5/2007
DE 112011104933 T5 3/2014
(Continued)

OTHER PUBLICATIONS

Written Opinion of the International Searching Authority and International Search Report for International Application No. PCT/KR2020/006563, dated Sep. 15, 2020, 11 page(s), English Translation of International Search Report Included.

*Primary Examiner* — Marc E Norman
(74) *Attorney, Agent, or Firm* — Dickinson Wright PLLC

(57) ABSTRACT

Disclosed is an air conditioner for a vehicle, the air conditioner having an improved guide structure capable of increasing an air volume by preventing a collision between air flowing through an upper passage and air flowing through a lower passage. The air conditioner for a vehicle comprises: an air conditioning case having an air passage formed therein and an air outlet which includes a defrost vent and a face vent; and a heat exchanger for cooling and a heat exchanger for heating, which are provided in the air passage of the air conditioning case. The air conditioner for the vehicle further comprises: a temperature door arranged between the heat exchanger for cooling and the heat exchanger for heating in order to adjust the degree to which cold air, which has passed through the heat exchanger for (Continued)

cooling, is heated by the heat exchanger for heating; a cold air passage through which cold air that has passed through the heat exchanger for cooling bypasses the heat exchanger for heating; a warm air passage through which cold air that has passed through the heat exchanger for cooling passes through the heat exchanger for heating; a cold air guide unit for guiding the cold air downstream of the heat exchanger for cooling; and a warm air guide unit for guiding the warm air downstream of the heat exchanger for heating.

16 Claims, 18 Drawing Sheets

(58) Field of Classification Search
CPC ...... B60H 1/00671; B60H 2001/00092; B60H 2001/00135; B60H 2001/00164; B60H 2001/002; B60H 2001/00721
See application file for complete search history.

(56) References Cited

U.S. PATENT DOCUMENTS

| | | | |
|---|---|---|---|
| 2013/0231036 A1* | 9/2013 | Kim | B60H 1/00064 |
| | | | 454/143 |
| 2016/0137022 A1 | 5/2016 | Sakakibara | |
| 2016/0236535 A1* | 8/2016 | Kuwayama | B60H 1/00678 |
| 2017/0274726 A1* | 9/2017 | Kitamura | B60H 1/00064 |
| 2018/0162192 A1* | 6/2018 | Lee | B60H 1/00692 |

FOREIGN PATENT DOCUMENTS

| | | |
|---|---|---|
| DE | 112014002797 T5 | 3/2016 |
| JP | 2000255247 A | 9/2000 |
| JP | 2014080103 A | 5/2014 |
| KR | 1020030016820 A | 3/2003 |
| KR | 1020080022924 A | 3/2008 |
| KR | 1020110085373 A | 7/2011 |
| KR | 101809981 B1 | 12/2017 |

* cited by examiner

PRIOR ART

PRIOR ART

PRIOR ART

FIG.7

| Mode | Air outlet | | Air volume (CMH) | |
|---|---|---|---|---|
| | | | Sub | Total |
| R-C-VENT | VENT | LH | 88.5 | 387.4 |
| | | LC | 99.9 | |
| | | RC | 97.8 | |
| | | RH | 92.2 | |
| | CONSOLE | | 56.9 | 56.9 |

Total: 435.3

FIG.8

| Mode | Air outlet | | Air volume (CMH) | |
|---|---|---|---|---|
| | | | Sub | Total |
| R-C-VENT | VENT | LH | 92.3 | 394.4 |
| | | LC | 106.8 | |
| | | RC | 100.1 | |
| | | RH | 92.2 | |
| | CONSOLE | | 60.7 | 60.7 |

Total: 435.3

AIR CONDITIONER FOR VEHICLE

CROSS-REFERENCE TO RELATED APPLICATIONS

This application is a U.S. National Stage of International Patent Application Serial No. PCT/KR2020/006563, filed May 20, 2020, which claims the benefit of Korean Patent Application Serial No. 10-2019-0059243, filed May 21, 2019, and Korean Patent Application Serial No. 10-2020-0020089, filed Feb. 19, 2020. The entire disclosures of each of the above applications are incorporated herein by reference.

TECHNICAL FIELD

The present invention relates to an air conditioner for a vehicle, and more particularly, to a two-layer air conditioner for a vehicle, which can secure defogging performance and maintain a high-performance heating during heating.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for a cooling action and a heater core for a heating action inside an air-conditioning case, and selectively blows the air cooled by the evaporator or heated by the heater core toward parts of the interior of the vehicle.

Especially, in order to secure defogging performance and maintain a high-performance heating during heating, a two-layer air conditioner has been developed. In order to defrost windshields while driving with heat in winter, cold outdoor air with low humidity is effective, but it causes drop of indoor temperature.

The two-layer air conditioner substantializes a two-layer air flow of indoor air and outdoor air by supplying outdoor air to the upper part of the vehicle and by circulating indoor air to the lower part of the vehicle, so as to effectively defrost using fresh outdoor air with low humidity supplied to the upper part and to maintain high-performance heating by providing fresh outdoor air to passengers and providing warm indoor air to the lower part.

FIG. 1 is a sectional view illustrating a conventional two-layer air conditioner for a vehicle. Referring to FIG. 1, the conventional two-layer air conditioner for a vehicle includes an air conditioning case 10. The air conditioning case 10 includes an air passage 14 of a predetermined form formed therein, an indoor air inlet 14a and an outdoor air inlet 14b which are formed at an entrance of the air passage to be partitioned by a partition wall 40, and a plurality of air outlets formed at an exit thereof. The air outlets are a defrost vent 16, a face vent 17, a floor vent 18, and a console vent 19.

The air conditioning case 10 includes a blower unit disposed at the entrance thereof, and an evaporator 2 and a heater core 3 mounted inside the air conditioning case 10 to be spaced apart from each other at a predetermined interval. An electric heater 4, such as a PTC, may be further disposed downstream of the heater core 3. The air passage of the air conditioning case 10 is partitioned into an upper passage and a lower passage by the partition wall 40. The air introduced into the indoor air inlet 14a flows to the lower passage, and the air introduced into the outdoor air inlet 14b flows to the upper passage. Meanwhile, a warm air passage has a baffle 45 disposed to prevent heat pickup by the heater core 3 and the electric heater 4.

The upper passage has a first temperature door 11 disposed to adjust the volume of the air passing through the heater core 3 and the volume of the air bypassing the heater core 3, and the lower passage has a second temperature door 12 disposed to adjust the volume of the air passing through the heater core 3 and the volume of the air bypassing the heater core 3. The air outlet has a defrost door 21 for adjusting the degree of opening of the defrost vent 16, and a face door 22 for adjusting the degree of opening of the face vent 17. Moreover, the air outlet further has a floor door 23 for adjusting the degree of opening of the floor vent 19, and a console door 24 for adjusting the degree of opening of the console vent 19.

FIG. 2 is a view illustrating a vent mode of the conventional two-layer air condition for a vehicle. Referring to FIG. 2, in the vent mode, the first temperature door 11 and the second temperature door 12 closes the warm air passage. Furthermore, the floor door 23 closes the floor vent 18, and the console door 24 closes the console vent 19. Cold air passing through the evaporator 2 bypasses the heater core 3, some of the air is discharged to the interior through the face vent 17 after passing through the upper passage, and the other is discharged to the interior through the face vent 17 after rising while passing through the lower passage.

In the vent mode of the conventional two-layer air conditioner for a vehicle, the air passing through the evaporator 2 is divided into an upper layer and a lower layer by bypassing the heater core 3, and moves toward the face door 22. In this instance, the moved air is not directly discharged to the face vent 17, and the upper layer air and the lower layer air introduced into a mixing part collide with each other to generate a vortex. So, the conventional two-layer air condition for a vehicle has a disadvantage in that the air volume is decreased because of an increase of resistance.

FIG. 3 is a view illustrating a floor mode of the conventional two-layer air condition for a vehicle. Referring to FIG. 3, in a floor mode, the first temperature door 11 and the second temperature door 12 opens the warm air passage. Furthermore, the floor door 23 opens the floor vent 18, and the console door 24 closes the console vent 19. Some of the warm air passing the heater core 3 and the defrost vent 16 after passing the evaporator 2 is discharged to the defrost vent 16 through the upper passage, and the other is discharged to the floor vent 18 through the lower passage.

Because the conventional two-layer air conditioner for a vehicle has a restriction in the package size, a part (A) of the passage gets narrower due to the baffle 45, which is formed in the warm air passage to prevent heat pickup. Accordingly, the air volume gets weak since the air of the upper warm air passage passing the heater core 3 cannot smoothly flow to the defrost vent 16 in a mixing zone (B). Finally, the conventional two-layer air conditioner for a vehicle has another disadvantage in that there is an excessive top and bottom temperature difference in the temperature evaluation of the floor mode.

DISCLOSURE

Technical Problem

Accordingly, the present invention has been made in an effort to solve the above-mentioned problems occurring in the prior arts, and it is an object of the present invention to provide an air conditioner for a vehicle which has an improved guide structure that can increase air volume by preventing collision of air moving through an upper passage and a lower passage.

It is another object of the present invention to provide an air conditioner for a vehicle, which can effectively improve the top and bottom temperature difference by inducing warm air passing a heater core toward a defrost vent and by inducing cold air passing an evaporator toward a defrost vent.

Technical Solution

To achieve the above objects, the present invention provides an air conditioner for a vehicle, which includes an air conditioning case having an air passage formed therein and air outlets which include a defrost vent and a face vent, and a heat exchanger for cooling and a heat exchanger for heating, which are provided in the air passage of the air conditioning case, the air conditioner including: a temperature door arranged between the heat exchanger for cooling and the heat exchanger for heating in order to adjust the degree of heating of cold air, which passed the heat exchanger for cooling, by the heat exchanger; a cold air passage through which cold air that passed the heat exchanger for cooling bypasses the heat exchanger for heating; a warm air passage through which the cold air that passed the heat exchanger for cooling passes the heat exchanger for heating; a cold air guide unit for guiding the cold air downstream of the heat exchanger for cooling; and a warm air guide unit for guiding the warm air downstream of the heat exchanger for heating.

Moreover, the air passage in the air conditioning case is partitioned into an upper passage and a lower passage by a partition wall. The warm air guide unit changes a flow path of the air, which will head toward the face vent after passing the heat exchanger for heating, to be guided to the defrost vent.

Furthermore, the warm air guide unit includes a bypass part that makes a flow path of the air guided to the defrost vent bypass so that the air is directly discharged to the face vent.

Additionally, a baffle for preventing heat pickup is disposed in the warm air passage downstream of the heat exchanger for heating in order to block heat of the heat exchanger for heating from influencing on cold air. The warm air guide unit extends integrally from an end portion of the baffle for preventing heat pickup.

In addition, the cold air guide unit guides the air passing the heat exchanger for cooling to the face vent, which adjoins the defrost vent, so that a mixing zone between the cold air and the warm air is moved toward the defrost vent.

Moreover, the warm air guide unit includes: a vertical part extending toward the face vent along the warm air passage downstream of the heat exchanger for heating; and a curved part curved toward the defrost vent from the upper end portion of the vertical part.

Furthermore, the war air guide unit has an opening part formed in the vehicle width direction.

Additionally, the air passage of the air conditioning case is formed to be partitioned in the vehicle width direction by a separator. The warm air guide unit is formed on both sides of the separator and on the inner surfaces of both sides of the air conditioning case in the vehicle width direction, and an opening part is formed between the warm air guide unit of the air conditioning case and the warm air guide unit of the separator.

In addition, the cold air guide unit has a streamlined surface formed on the surface facing the cold air passage, includes a vent door for adjusting the degree of opening of the face vent, and an extension line of the end portion of the streamlined surface is formed side by side with the vent door at an angle that the vent door fully opens the face vent.

Moreover, a surface rib for reinforcing rigidity protrudes from the outer face of the air conditioning case, and the warm air guide unit is on the inner wall surface of the air conditioning case to correspond to the surface rib of the air conditioning case so as to perform a guide function and a rigidity reinforcing function. At least one inclined part is disposed on the inner wall surface of the air conditioning case to make the air conditioning case protrude in the form of a surface rib, and the warm air guide unit extends in contact with the inclined part.

Furthermore, the warm air guide unit is formed to be closer to the face vent than the extension line of a heat exchanger support part on the upper portion of the heat exchanger for heating. The warm air guide unit is located between the extension line of a heat exchanger support part on the upper portion of the heat exchanger for heating and an extension line of the cold air guide unit. The cold air guide unit extends from a temperature door seating part to the heat exchanger support part on the upper portion of the heat exchanger for heating so as to be arranged above and in front of the heat exchanger for heating.

Additionally, air conditioner for a vehicle further includes a vent door for adjusting the degree of opening of the face vent, and the cold air guide unit and the warm air guide unit change the point, where the cold air of the cold air passage and the warm air of the warm air passage are mixed, to approach the face vent.

In addition, the cold air guide unit and the warm air guide unit are formed at the top of the rear surface of the heat exchanger for heating.

Moreover, the cold air guide unit and the warm air guide unit guide air to head in a range of the opening part formed by the vent door and the face vent.

Furthermore, the air conditioning case is partitioned into an upper passage and a lower passage by a partition wall, and includes: a first temperature door disposed in the upper passage to adjust an amount of air passing the heat exchanger for heating and an amount of air bypassing the heat exchanger for heating; and a second temperature door disposed in the lower passage to adjust an amount of air passing the heat exchanger for heating and an amount of air bypassing the heat exchanger for heating. The cold air guide unit and the warm air guide unit guide the air to face a rotary shaft of the vent door.

Additionally, the vent door is a center pivot type door of which both ends rotate around the rotary shaft, and the face vent has a first opening area formed at one side based on the rotary shaft and a second opening area formed at the other side based on the rotary shaft.

Moreover, the cold air guide unit guides the air to the first opening area, and the warm air guide unit guides the air to the second opening area.

Furthermore, the first opening area is wider than the second opening area.

Additionally, the upper passage includes an upper cold air passage and an upper warm air passage, the lower passage includes a lower warm air passage and a lower cold air passage, and the upper cold air passage, the upper warm air passage, the lower warm air passage, and the lower cold air passage are formed in order from the top. The upper passage and the lower passage communicate with each other. The cold air guide unit guides the air, which flows in the upper cold air passage, to the first opening area, and the warm air guide unit guides the air, which flows in at least one among the upper warm air passage, the lower warm air passage and the lower cold air passage, to the second opening area.

Advantageous Effects

The air conditioner for a vehicle according to an embodiment of the present invention can increase air volume by preventing collision of air moving through the upper passage and the lower passage, and is favorable to manufacturability and assemblability by optimizing the form and position of the air conditioner.

Additionally, the air conditioner for a vehicle according to an embodiment of the present invention can reduce top and bottom temperature difference in the floor mode because of a rise of temperature at the outlet of the defrost vent in a temperature control evaluation, enhance mixing performance since cold air and warm air are concentrated in the same direction, is favorable for temperature evaluation, and enhance dynamic stiffness of the air conditioning case by optimizing the form and position of the guide unit.

DESCRIPTION OF DRAWINGS

FIG. 7 illustrates an air volume evaluation result of a two-layer air conditioner for a vehicle to which the guide unit is not applied.

FIG. 8 illustrates an air volume evaluation result of the two-layer air conditioner for a vehicle according to the first preferred embodiment of the present invention, to which the guide unit is applied.

MODE FOR INVENTION

Hereinafter, an air conditioner for a vehicle according to preferred embodiments of the present invention will now be described in detail with reference to the attached drawings.

Figure 1:
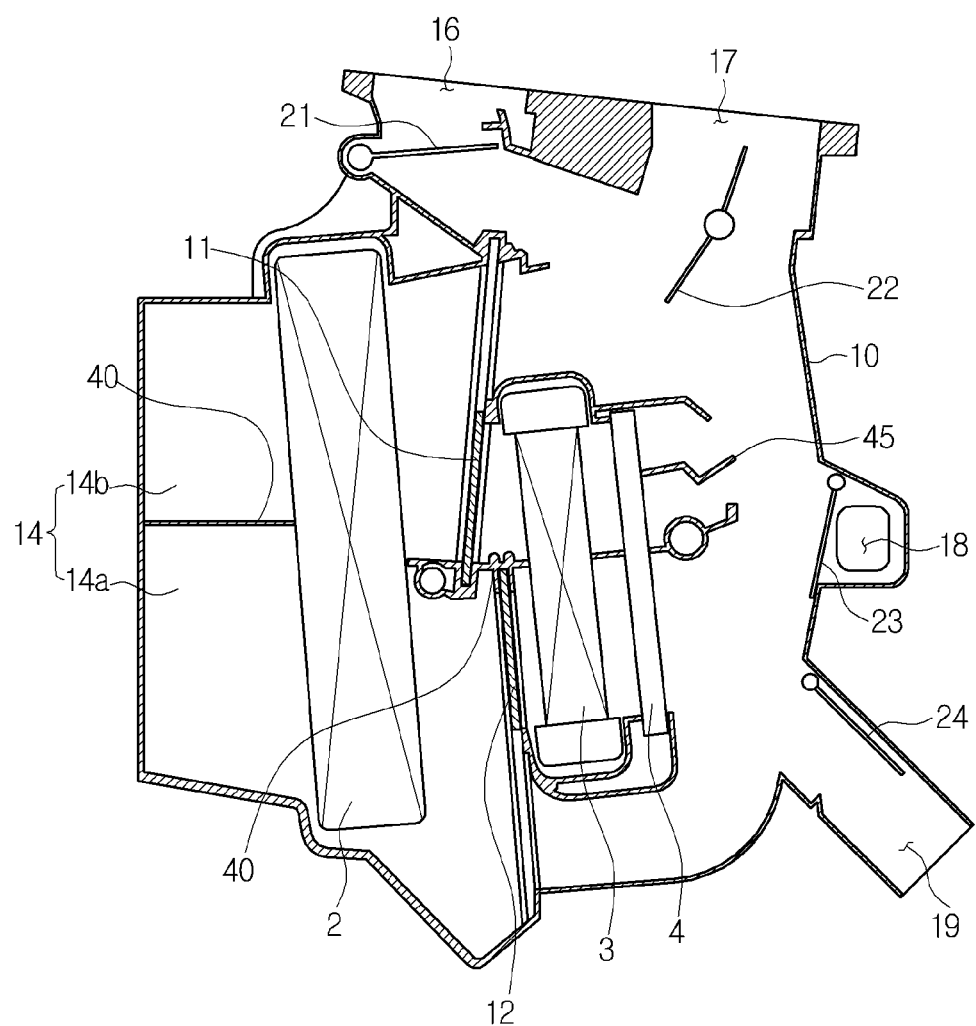
FIG. 1 is a sectional view illustrating a conventional two-layer air conditioner for a vehicle.
Figure 2:
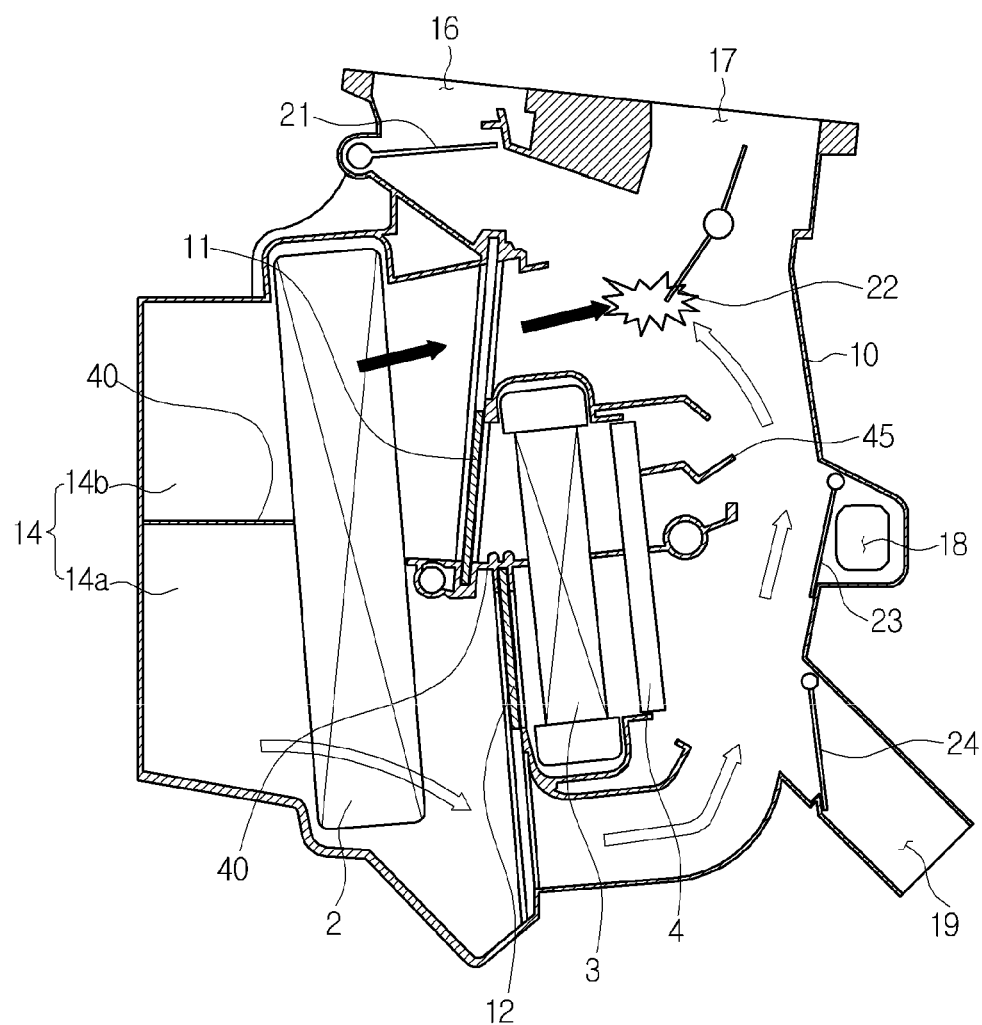
FIG. 2 is a view illustrating a vent mode of the conventional two-layer air condition for a vehicle.
Figure 3:
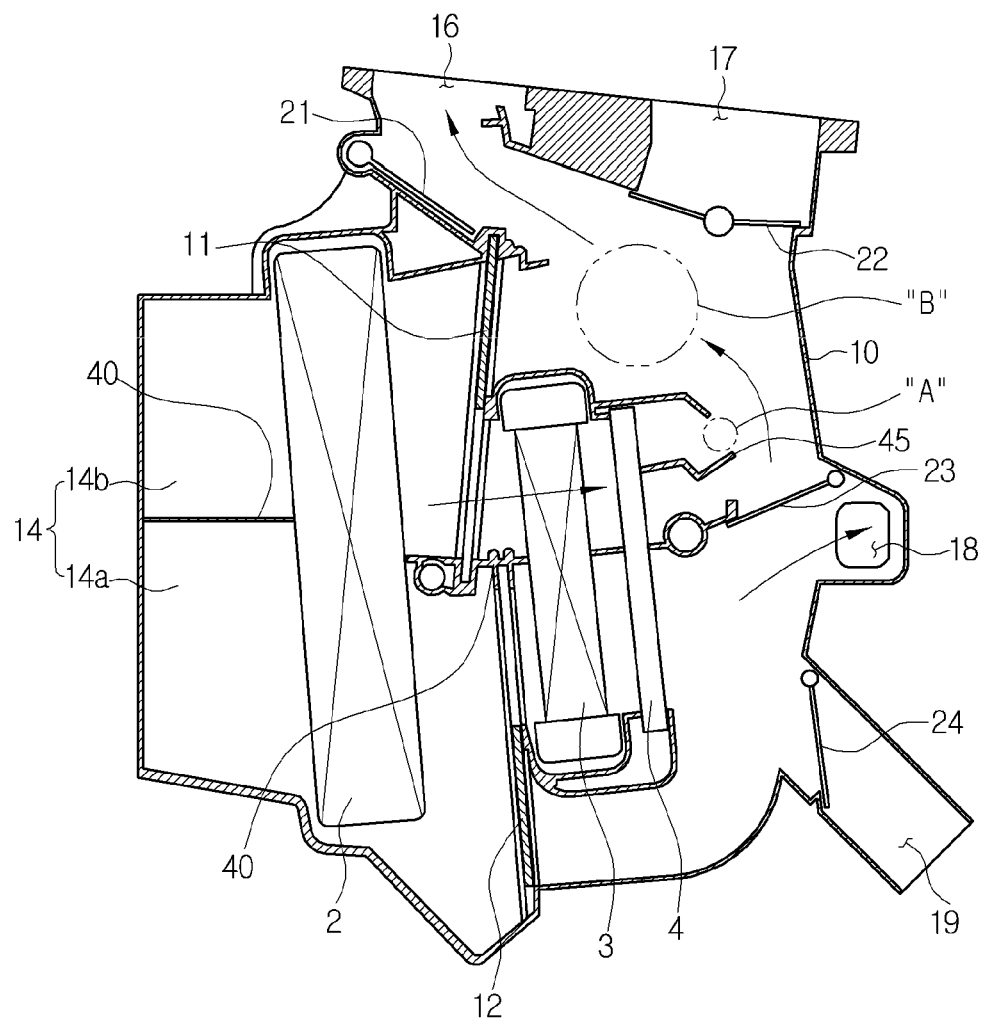
FIG. 3 is a view illustrating a floor mode of the conventional two-layer air condition for a vehicle.
Figure 4:
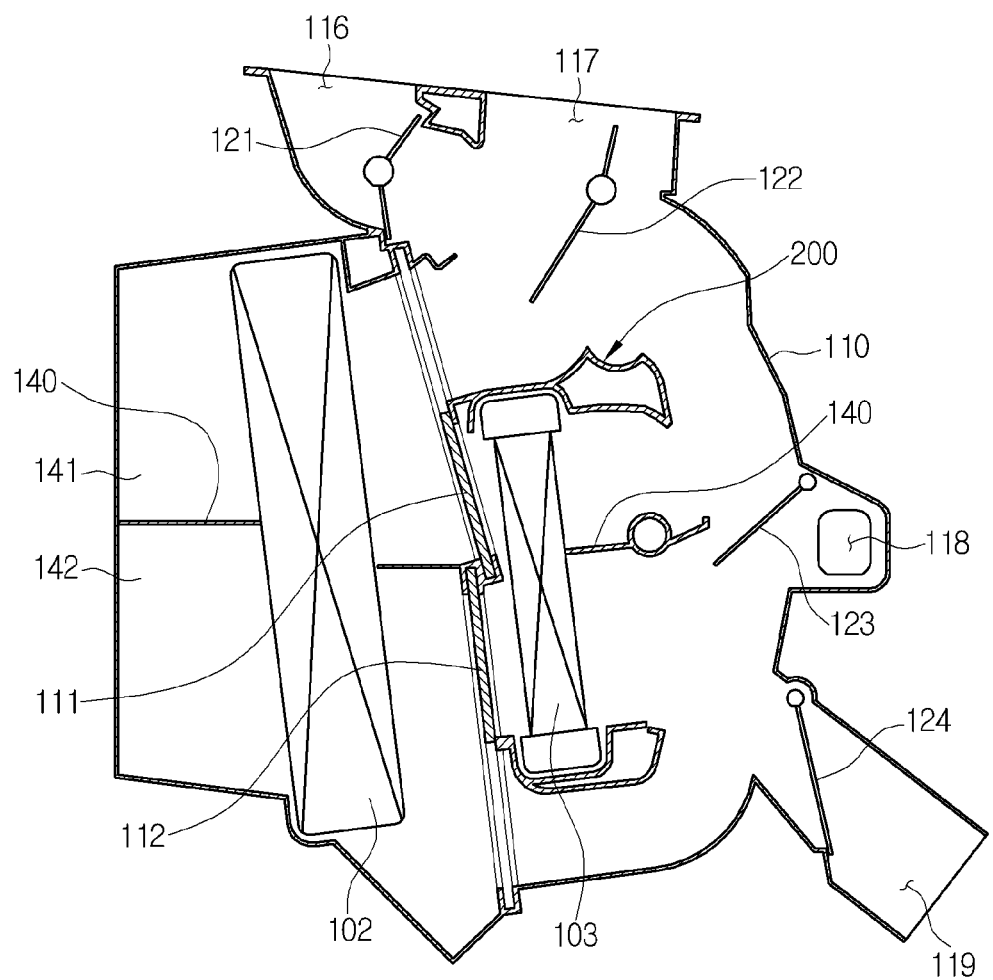
FIG. 4 is a sectional view illustrating a two-layer air conditioner for a vehicle according to a first preferred embodiment of the present invention.
Figure 5:
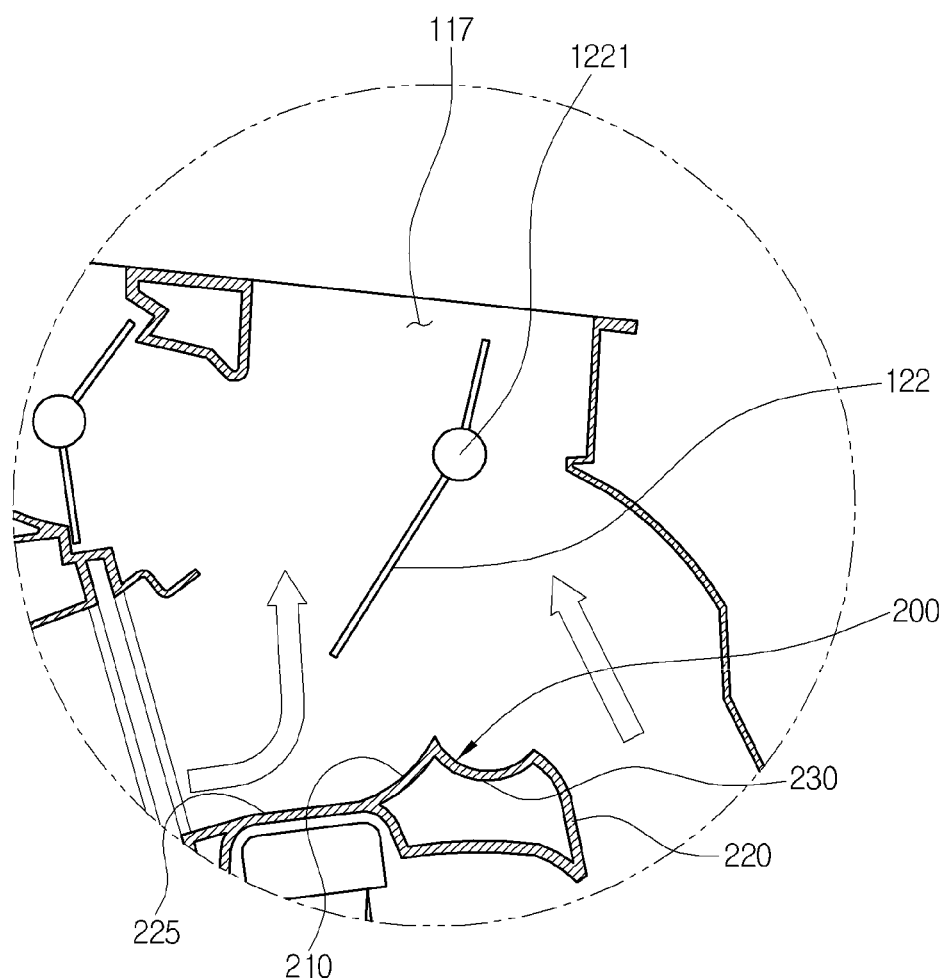
FIGS. 5 and 6 are enlarged sectional views of a guide unit according to the first preferred embodiment of the present invention.
Figure 6:
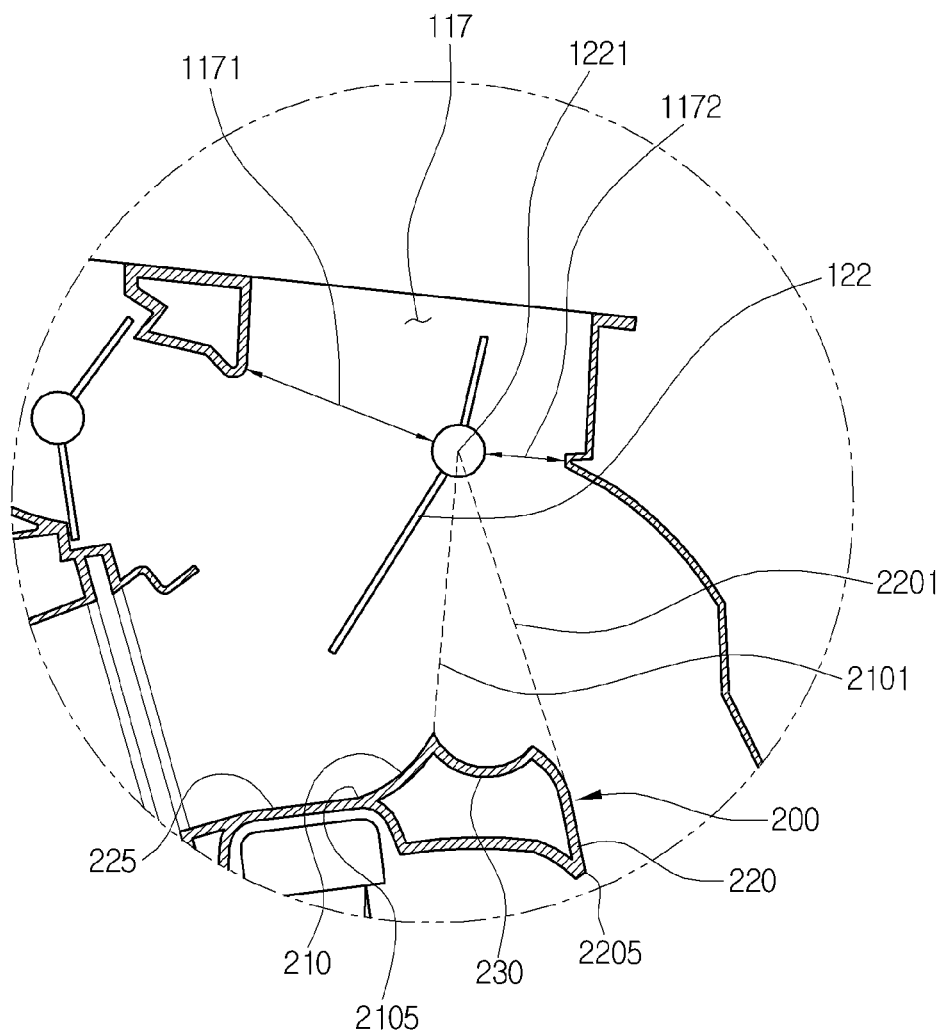
Figure 9:
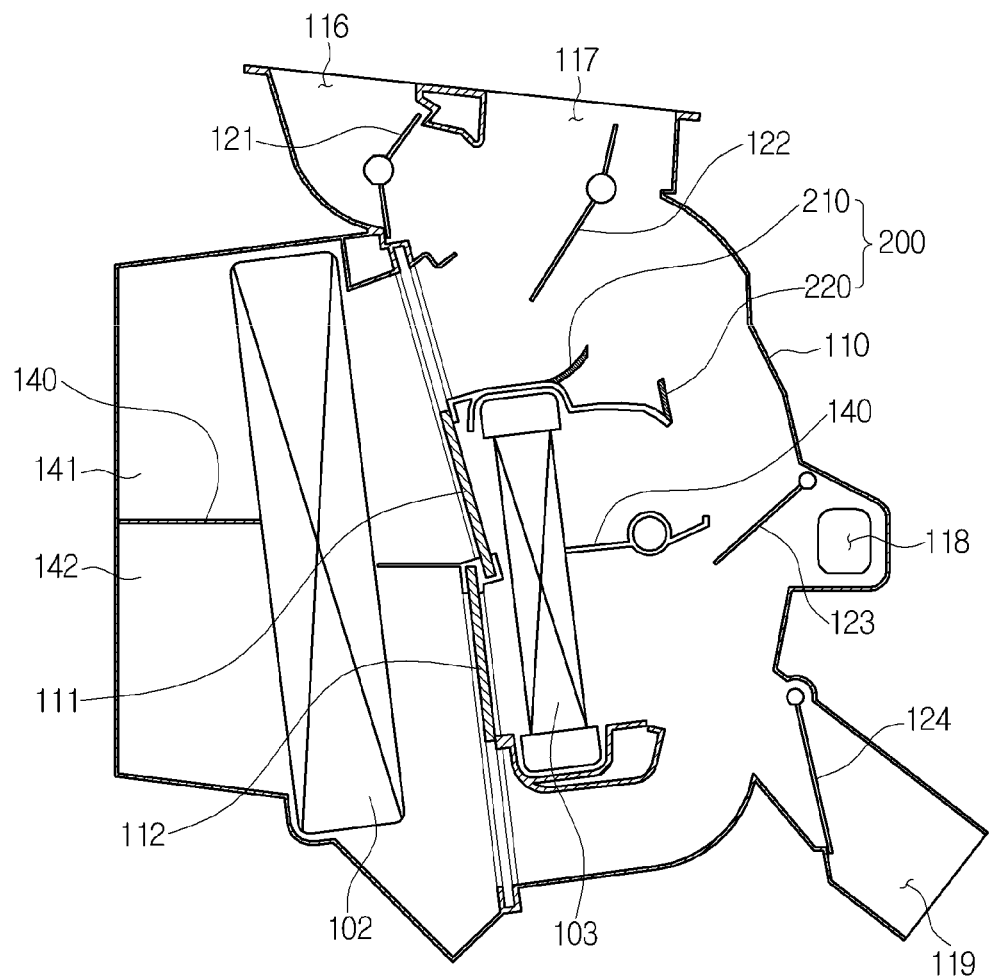
FIG. 9 is a view illustrating a modification of FIG. 4.

FIG. 4 is a sectional view illustrating a two-layer air conditioner for a vehicle according to a first preferred embodiment of the present invention, FIGS. 5 and 6 are enlarged sectional views of a guide unit according to the first preferred embodiment of the present invention, FIG. 7 illustrates an air volume evaluation result of a two-layer air conditioner for a vehicle to which the guide unit is not applied, FIG. 8 illustrates an air volume evaluation result of the two-layer air conditioner for a vehicle according to the first preferred embodiment of the present invention, to which the guide unit is applied, and FIG. 9 is a view illustrating a modification of FIG. 4.

In the description of the present invention, the right-and-left direction of FIG. 4 is the back-and-forth direction of the vehicle.

Referring to FIGS. 4 to 9, the two-layer air conditioner for a vehicle according to the first preferred embodiment of the present invention includes an air conditioning case 110. The air conditioning case 110 has an air passage of a predetermined form therein. The air conditioning case 110 has an air inlet formed at an entrance of the air passage, and a plurality of air outlets formed at an exit of the air passage. The air outlets are a defrost vent 116, a face vent 117, a floor vent 118, and a console vent 119. The air conditioning case 110 includes doors disposed therein. The doors are configured to open and close the air outlets, and include a defrost door 121 for adjusting the degree of opening of the defrost vent 116, a vent door 122 for adjusting the degree of opening of the face vent 117, a floor door 123 for adjusting the degree of opening of the floor vent 118, and a console door 124 for adjusting the degree of opening of the console vent 119.

The air conditioning case 110 further includes a blower unit disposed at the entrance, and heat exchangers mounted therein. The heat exchangers are configured to exchange heat with air passing through the air conditioning case, and include a heat exchanger for cooling and a heat exchanger for heating, which are arranged in the air passage of the air conditioning case 110 in order. The heat exchanger for cooling is an evaporator 102, and the heat exchanger for heating is a heater core 103. The evaporator 102 and the heater core 103 are mounted in order in the air flow direction to be spaced apart from each other at a predetermined interval.

The air passage of the air conditioning case 110 is partitioned into an upper passage 141 and a lower passage 142 by a partition wall 140. The air introduced into an indoor air inlet flows into the lower passage 142, and the air introduced into an outdoor air inlet flows into the upper passage 141. The partition wall 140 extends to the upstream side of the evaporator 102, between the evaporator 102 and the heater core 103, and downstream of the heater core 103.

A first temperature door 111 is disposed on the upper passage 141 to adjust the volume of the air passing through the heater core 103 and the volume of the air bypassing the heater core 103, and a second temperature door 112 is disposed on the lower passage 142 to adjust the volume of the air passing through the heater core 103 and the volume of the air bypassing the heater core 103.

That is, the upper passage 141 includes an upper cold air passage and an upper warm air passage, and the lower passage 142 includes a lower warm air passage and a lower cold air passage. The upper cold air passage, the upper warm air passage, the lower warm air passage, and the lower cold air passage are arranged in order from the top. The upper passage 141 and the lower passage 142 are disposed to communicate with each other. The floor door 123 is located on the rear surface of the heater core 103 to face the heater core. The floor door 123 touches the partition wall 140 when rotating to the maximum in the clockwise direction.

Rotating to the maximum in the clockwise direction, the floor door 123 touches the partition wall 140 to function as the partition 140, which partitions the upper passage 141 and the lower passage 142 from each other. On the contrary, When the floor door 123 rotates to the maximum in the counterclockwise direction, the floor vent 118 is closed, and the upper passage 141 and the lower passage 142 communicates with each other.

Moreover, the air conditioner for a vehicle includes a guide unit 200. The guide unit 200 includes a cold air guide unit for guiding cold air downstream of the evaporator 102, and a warm air guide unit for guiding warm air downstream side the heater core 103. The guide unit 200 functions to make the point, where two kinds of air to adjust temperature are mixed, approach the air outlet. That is, the guide unit 200 guides the air to be in a range of an opening part formed by the door and the air outlet. Furthermore, the guide unit 200 guides the cold air passage and the warm air passage to face a rotary shaft 1221 of the vent door 122. Therefore, the air of the cold air passage and the air of the warm air passage flow toward the rotary shaft 1221 of the vent door 122.

So, the air conditioner for a vehicle can prevent a vortex generated by collision of the air flowing in the cold air passage and the air flowing in the warm air passage, thereby increasing the volume of the air flowing toward the face vent 117.

The vent door 122 is a center pivot type door which rotates around the rotary shaft 1221. The vent door 122 includes a main plate extending from the rotary shaft 1221 in a radial direction, and a tail plate extending in the opposite direction from the main plate. The main plate covers an area which is wider than an area covered by the tail plate.

The face vent 117 includes a first opening area 1171 formed at a side based on the rotary shaft 1221, and a second opening area 1172 formed at the other side based on the rotary shaft 1221. The first opening area 1171 is the front side of the vent door 122, and is an area covered by the main plate of the vent door 122. The second opening area 1172 is the rear side of the vent door 122, and is an area covered by the tail plate. The first opening area 1171 is formed to be wider than the second opening area 1172.

The guide unit 200 includes a first guide unit 210 and a second guide unit 220. The first guide unit 210 is a cold air guide unit, and the second guide unit 220 is a warm air guide unit. The first guide unit 210 guides the air to the first opening area 1171, and the second guide unit 220 guides the air to the second opening area 1172.

In the vent mode, an amount of the air flowing through the upper passage 141 is more than an amount of the air flowing through the lower passage 142. Because the first opening area 1171 is wider than the second opening area 1172, the air of the upper passage 141 guided by the first guide unit 210 is discharged to the first opening area 1171 which is relatively wider, and the air of the lower passage 142 guided by the second guide unit 220 is discharged to the second opening area 1172 which is relatively narrower, so that total volume of the discharged air can be increased.

An extension line 2101 of the first guide unit 210 and an extension line 2201 of the second guide unit 220 are formed to face the rotary shaft 1221 of the vent door 122. That is, the extension line 2101 of the first guide unit 210 and the extension line 2201 of the second guide unit 220 meet each other at the rotary shaft 1221 of the vent door 122.

Through the above configuration, the first guide unit 210 guides the air flowing in the upper cold air passage to the first opening area 1171. In addition, the second guide unit 220 guides the air flowing in at least one among the upper warm air passage, the lower warm air passage and the lower cold air passage to the second opening area 1172.

In the mixing mode, some of the air passing the evaporator 102 passes the heater core 103, and the other bypasses the evaporator 102. Such an air flow can occur in the upper passage 141 and in the lower passage 142 at the same time. The air passing the upper cold air passage after passing the evaporator 102 is guided to the first opening area 1171 by the first guide unit 210, and the air passing the lower cold air passage after passing the evaporator 102 rises and is guided to the second opening area 1172 by the second guide unit 220.

In more detail, the air passing the upper cold air passage is essentially guided by the first guide unit 210, and the air passing at least one among the upper warm air passage, the lower warm air passage, or the lower cold air passage is essentially guided by the second guide unit 220. In this instance, depending on the operation of the floor door 123, it is determined that the upper passage 141 and the lower passage 142 communicate with each other, and it is also determined that the air of the lower warm air passage and the air of the lower cold air passage flow to the second guide unit 220.

In other words, the first guide unit 210 is formed at a rear upper end portion 2015 of the heater core 103 to face the rotary shaft 1221 of the vent door 122, so that the flow of upper passage 141 faces the front surface of the vent door 122. In more detail, the first guide unit 210 is curved to be streamlined toward the rotary shaft 1221 of the vent door 122 from the rear upper end portion 2015 of the heater core 103.

The air of the upper cold air passage which passes the evaporator 102, bypasses the heater core 103 and flows the upper passage 141 flows approximately horizontally up to the upper portion of the heater core 103. The first opening area 1171 of the face vent 117 is located directly above the rear upper end portion 2015 of the heater core 103. The streamlined first guide unit 210 softly converts the direction of the air horizontally flowing in the upper cold air passage into an upward direction. Therefore, the air is guided to the first opening area 1171 of the face vent 117 without any increase of resistance so as to increase the air volume.

Moreover, the second guide unit 220 makes the flow of the lower passage 142 face the rear surface of the vent door 122 so that the flow of the lower passage 142 faces the rotary shaft 1221 of the vent door 122 at a lower flow end 2205. In more detail, the second guide unit 220 extends from the lower flow end 2205 to be inclined toward the rotary shaft 1221 of the vent door 122.

The air of the lower cold air passage which passes the evaporator 102, bypasses the heater core 103 and flows in the lower passage 142 flows approximately horizontally up to the lower portion of the heater core 103, and then, flows upwards along a communication path between the upper passage and the lower passage opened by the floor door 123.

The second opening area 1172 of the face vent 117 is located approximately diagonally above the lower flow end portion 2205. The second guide unit 220 which extends to be inclined softly converts the direction of the air flowing upwards in the lower cold air passage so that the air flows diagonally upwards to be in a range of the second opening area 1172. Therefore, the air is guided to the second opening area 1172 of the face vent 117 without any increase of resistance so as to increase the air volume.

The guide unit 200 is formed at the top of the rear surface of the heater core 103. Additionally, the guide unit 200 includes a connection part 230 which connects the first guide unit 210 and the second guide unit 220 with each other. The first guide unit 210, the connection part 230, and the second guide unit 220 extend integrally from a heat exchanger support part 225 of the air conditioning case 110 to support the heater core 103.

In the meantime, as illustrated in FIG. 9, it is also possible that the connection part is not formed and the first guide unit 210 and the second guide unit 220 are formed to be spaced apart from each other. However, as illustrated in FIG. 4, if the first guide unit 210, the second guide unit 220, and the connection part 230 are formed integrally on the air conditioning case 110, it is favorable in manufacturability since a mold design is simplified, and can improve structural intensity since the connection part 230 supports the first guide unit 210 and the second guide unit 220.

Moreover, the air conditioner for a vehicle according to the preferred embodiment of the present invention can increase intensity by a space surrounded by the first guide unit 210, the second guide unit 220, and the connection part 230, and enhance assemblability since the first guide unit 210, the second guide unit 220, and the connection part 230 serve as a support part when right and left cases are assembled.

Meanwhile, referring to FIG. 7, in case of a two-layer air conditioner, to which the guide unit is not applied, it is confirmed that the air volume of the left side vent (LH) is 88.5, the air volume of the left center vent (LC) is 99.9, the air volume of the right center vent (RC) is 97.8, the air volume of the right side vent (RH) is 92.2, and the total air volume is 435.3.

Meanwhile, referring to FIG. 8, in case of a two-layer air conditioner, to which the guide unit is applied, it is confirmed that the air volume of the left side vent (LH) is 92.3, the air volume of the left center vent (LC) is 106.8, the air volume of the right center vent (RC) is 100.1, the air volume of the right side vent (RH) is 95.2, and the total air volume is 455.1. As described above, it was confirmed experimentally that the air volume of each outlet and the total air volume were increased when the guide unit was applied.

Figure 10:
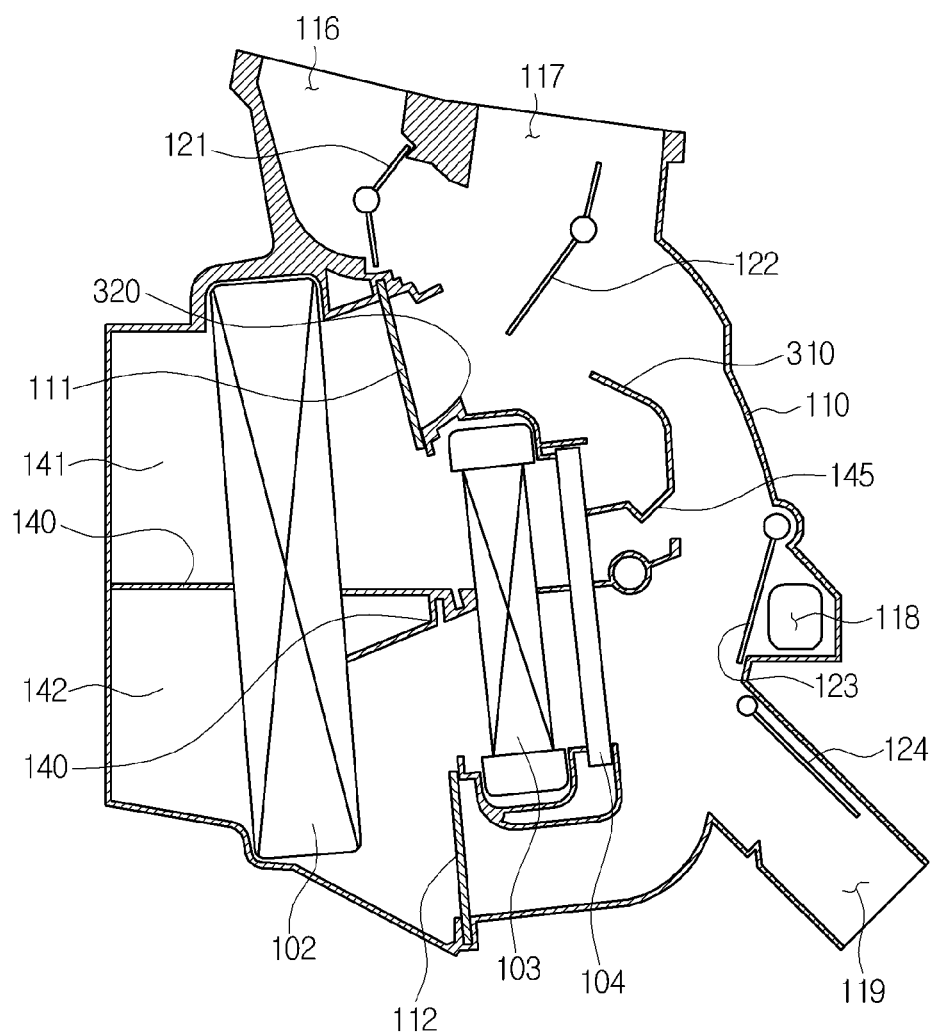
FIG. 10 is a sectional view illustrating a two-layer air conditioner for a vehicle according to a second preferred embodiment of the present invention.
Figure 11:
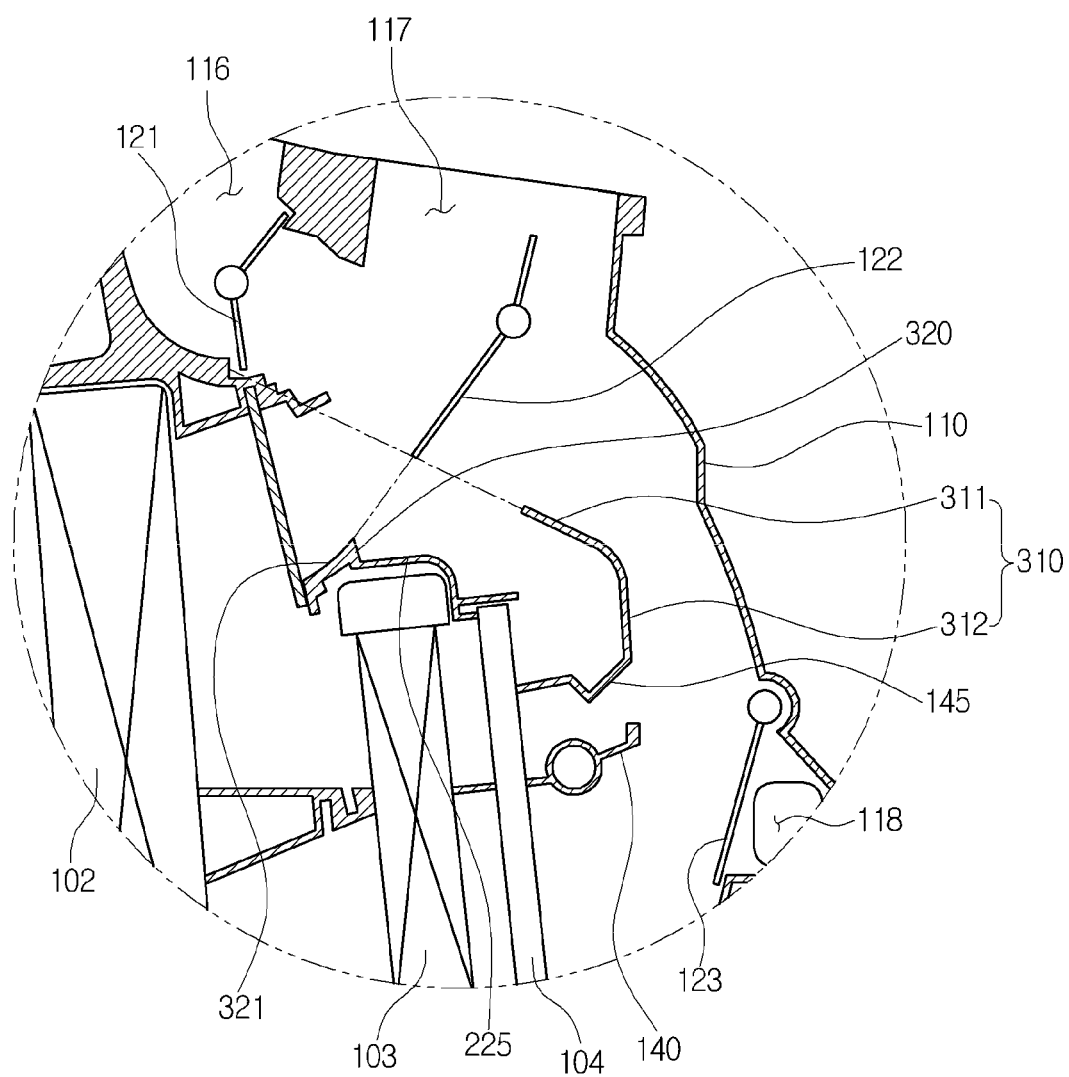
FIG. 11 is a partially enlarged sectional view of FIG. 10.
Figure 12:
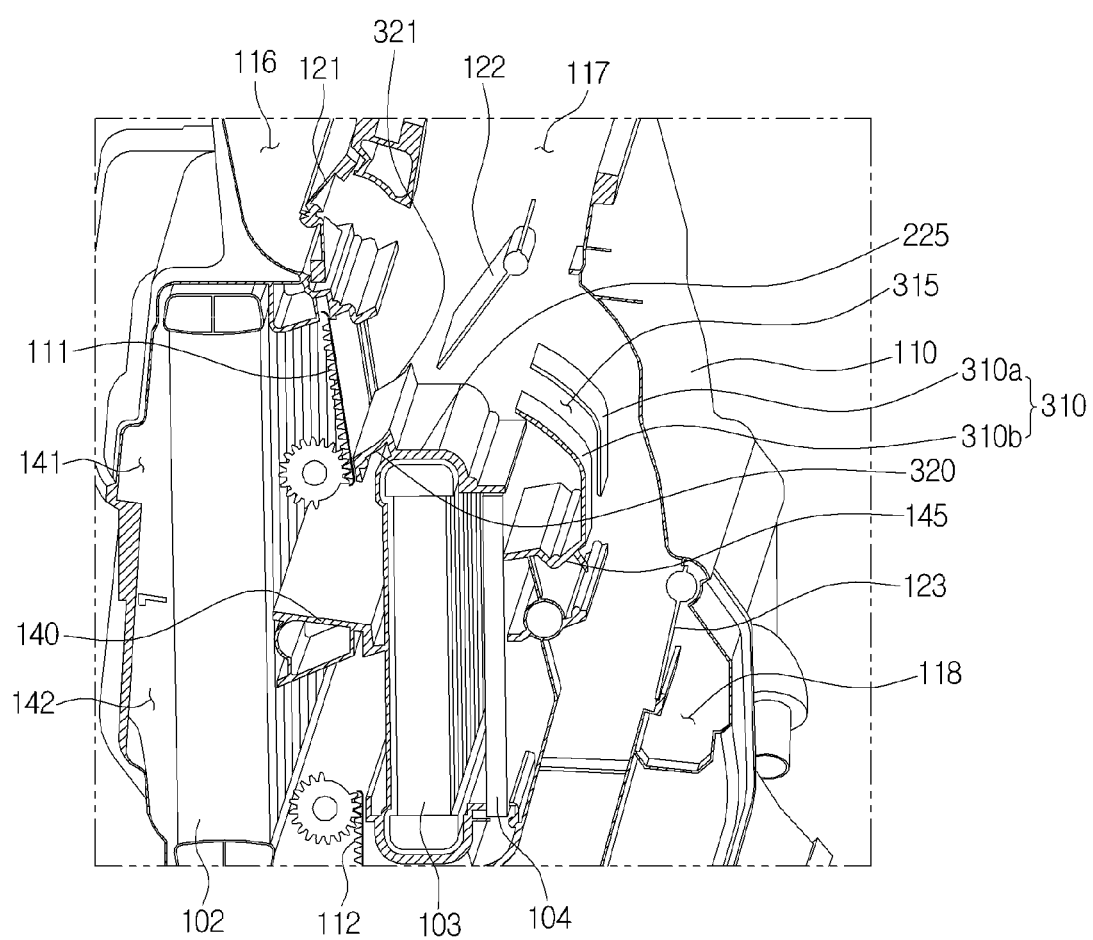
FIG. 12 is a perspective view illustrating the inside of a part of an air conditioning case according to the second preferred embodiment of the present invention.
Figure 13:
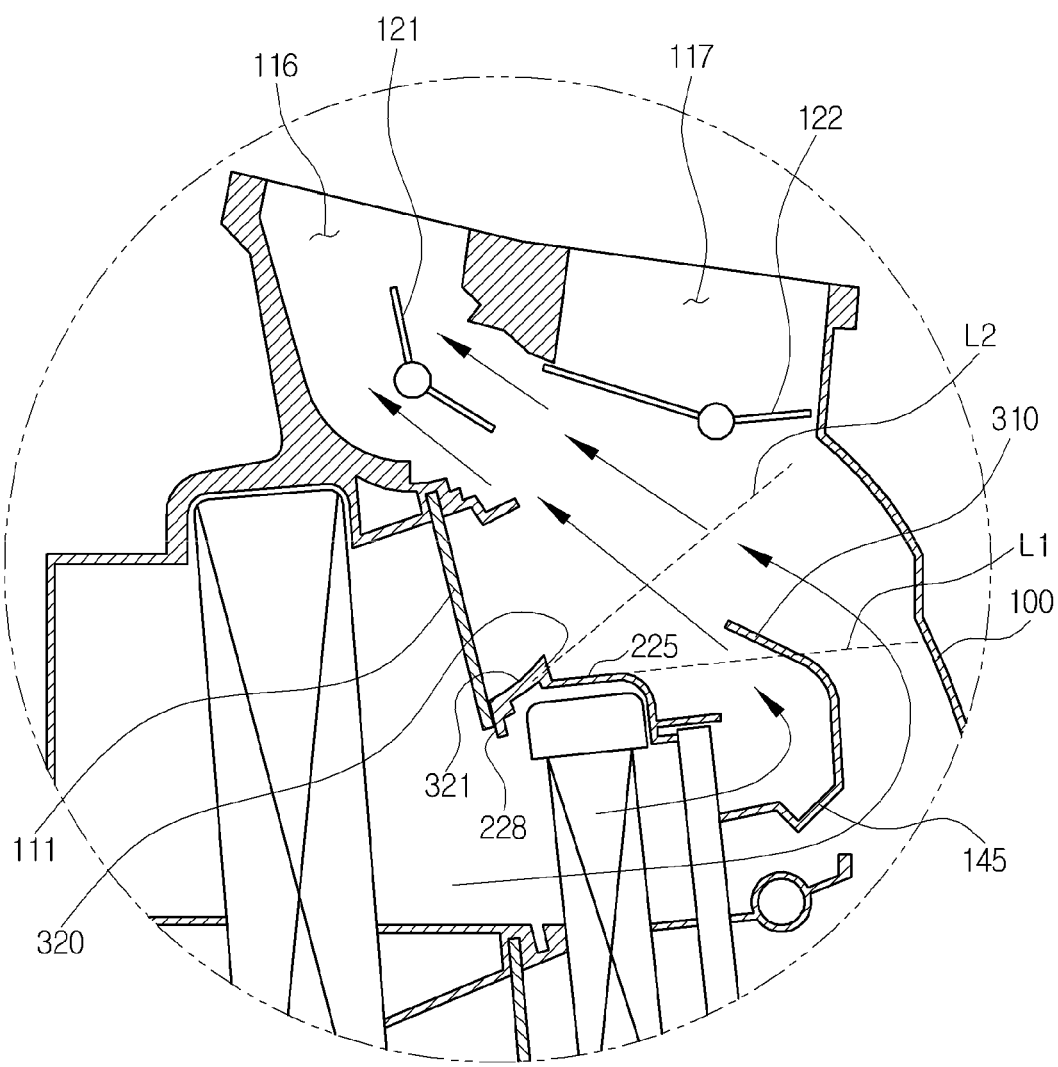
FIGS. 13 and 14 are sectional views illustrating operational examples of FIG. 11.
Figure 14:
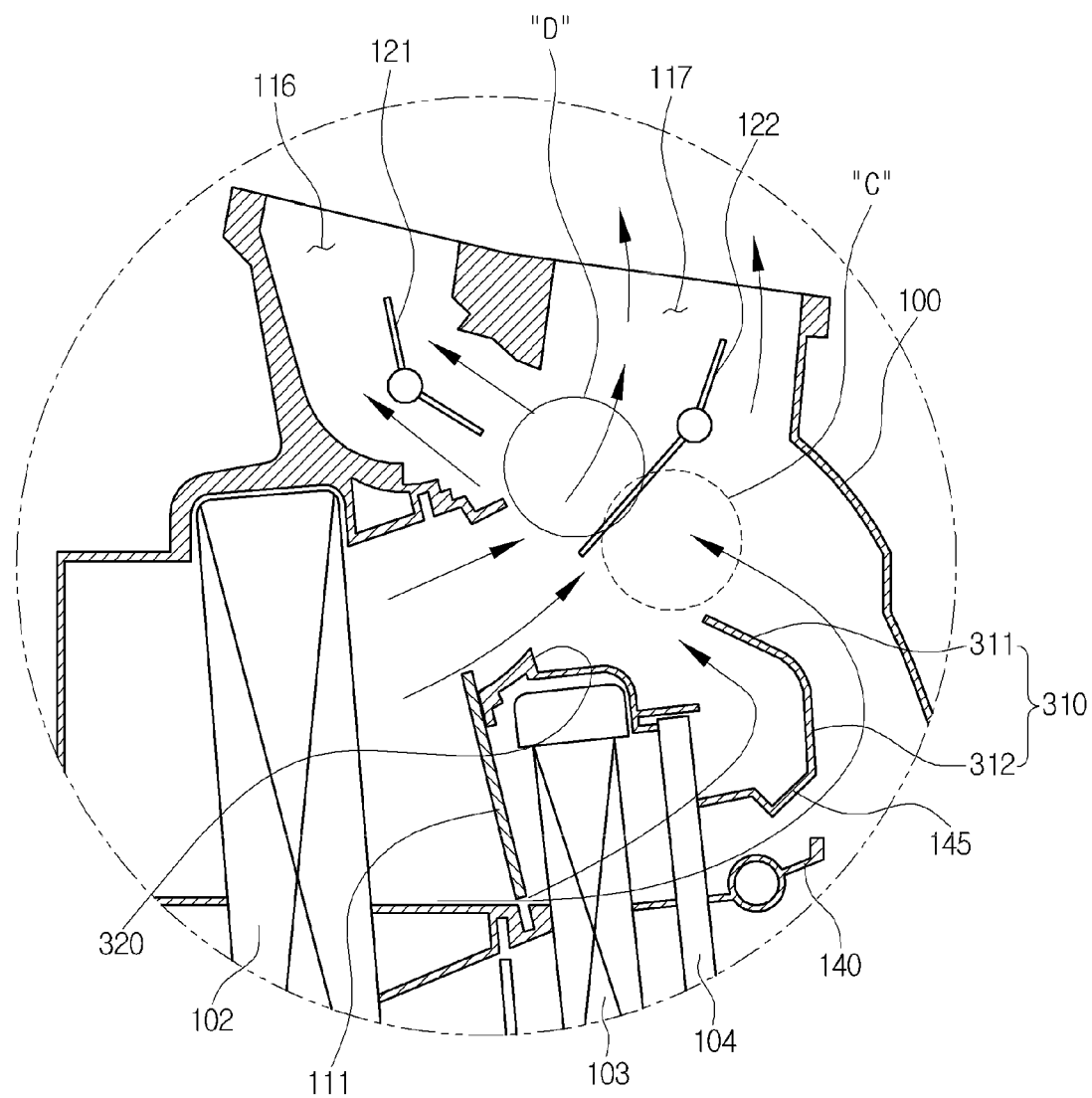

FIG. 10 is a sectional view illustrating a two-layer air conditioner for a vehicle according to a second preferred embodiment of the present invention, FIG. 11 is a partially enlarged sectional view of FIG. 10, FIG. 12 is a perspective view illustrating the inside of a part of an air conditioning case according to the second preferred embodiment of the present invention, and FIGS. 13 and 14 are sectional views illustrating operational examples of FIG. 11.

Hereinafter, the right-and-left direction in FIG. 10 is the back-and-forth direction of the vehicle. Compared with the first preferred embodiment, in the second preferred embodiment, like components are referenced by like reference numerals and description thereof is not repeated.

Referring to FIGS. 10 to 14, the two-layer air conditioner for a vehicle according to the second preferred embodiment of the present invention includes an air conditioning case 110, an evaporator 102, a heater core 103, a first temperature door 111, and a second temperature door 112. Air outlets of the air conditioning case 110 include a defrost vent 116, a face vent 117, a floor vent 118, and a console vent 119. An electric heater 104, such as a PTC, is disposed downstream of the heater core 103 in the air flow direction. The air outlet includes a defrost door 121, a vent door 122, a floor door 123, and a console door 124 disposed to adjust the degree of opening of the vents. An air passage of the air conditioning case 110 is partitioned into an upper passage 141 and a lower passage 142 by the partition wall 140.

The air conditioner for a vehicle includes a third guide unit 310 and a fourth guide unit 320. The third guide unit 210 is a warm air guide unit, and the fourth guide unit 220 is a cold air guide unit. The third guide unit 310 guides warm air downstream of the heater core 103 to the defrost vent 116. The fourth guide unit 320 guides cold air downstream of the evaporator 102 to the face vent 117.

That is, the third guide unit 310 guides a flow path of the air of the upper passage 141, which passes the heater core 103 to head toward the face vent 117, to the defrost vent 116. In addition, the third guide unit 310 includes a bypass part which bypasses the flow path of the air guided to the defrost vent 116 so that the air is discharged to the face vent 117.

Moreover, the fourth guide unit 320 is disposed between the evaporator 102 and the heater core 103. The fourth guide unit 320 guides the air passing the evaporator 102 to the face vent 117 adjacent to the defrost vent 116. That is, the defrost vent 116 and the face vent 117 are formed on the upper surface of the air conditioning case 110 to be side by side from the front of the vehicle to the rear. The fourth guide unit 320 moves the mixing zone between the cold air and the warm air toward the defrost vent.

In detail, a baffle 145 for preventing heat pickup is disposed in the warm air passage downstream of the heater core 103. The baffle 145 for preventing heat pickup partitions between the passage downstream of the heater core 103 and the passage bypassing the heater core 103 in order to block the heat pickup phenomenon that heat of the heater core 103 influences on cold air. The third guide unit 310 extends integrally from an end portion of the baffle 145 for preventing heat pickup.

The baffle 145 for preventing heat pickup has good function to prevent the heat pickup phenomenon, but has adverse effect that makes the upper warm air passage passing the heater core 103 get narrower. Finally, because of the baffle 145 for preventing heat pickup, warm air passing the heater core 103 gets weaker when the warm air flows toward the defrost vent 116 from the mixing zone.

In order to solve the above problem, the third guide unit 310 guides the warm air of the upper warm air passage passing the heater core 103 to fully move toward the outlet of the defrost vent 116 after passing the mixing zone. Therefore, in the temperature control evaluation, temperature of the outlet of the defrost vent 116 rises, so that the top and bottom temperature difference between the defrost vent 116 and the floor vent 118 can be improved in the floor mode.

As described above, the third guide unit 310 has good function to increase warm air volume toward the defrost vent 117, but has adverse effect that the air volume toward the face vent 117 is decreased. The fourth guide unit 320 can prevent a decrease of the air volume toward the face vent 117 by the third guide unit 310 by guiding cold air toward the face vent 117, and improve mixability between cold air and warm air by moving the mixing zone toward the defrost vent 116.

In more detail, the third guide unit 310 includes a vertical part 312, a curved part 311, and an opening part 315. The vertical part 312 extends toward the face vent 117 along the warm air passage downstream of the heater core 103. The curved part 311 extends from the upper end portion of the vertical part 312 toward the defrost vent 116 to be curved. The opening part 315 is formed at a predetermined portion of the third guide unit 310 in the vehicle width direction. The opening part 315 serves the function of the bypass part.

Due to the configuration of the opening part 315, the flow path of the air guided toward the defrost vent 116 is bypassed, and the air of the war air passage passing the heater core 103 is directly discharged to the face vent 117. Through the above, the third guide unit can minimize a loss of air volume and prevent deterioration in air-conditioning performance while carrying out the guide function sufficiently.

The third guide unit 310 extends integrally from the inner wall surfaces of the left case and the right case. In this instance, the third guide unit of the left case and the third guide unit of the right case are spaced apart from each other at a predetermined interval in the vehicle width direction, and the opening part 315 is formed between the third guide units. Due to the above structure, the third guide unit can be formed integrally in a rib shape when the left case and the right case are injection-molded without any additional boring process. The opening part 315 is effectively formed without increase of manufacturing costs.

In more detail, the air conditioning case 110 is formed by the combination of the left case, the right case, and a separator. The air passage of the air conditioning case 110 is partitioned into the left and the right in the vehicle width direction by the separator. The third guide unit 310 is formed on both sides of the separator and on both inner surfaces of the air conditioning case 110 in the vehicle width direction. That is, the opening part 315 is formed between a third guide unit 310a of the air conditioning case and a third guide unit 310b of the separator. Therefore, when the left case and the right case are assembled, since the third guide unit 310a of the air conditioning case and the third guide unit 310b of the separator are not directly assembled, assemblability is improved.

The baffle 145 for preventing heat pickup is formed in the upper passage 141 of the warm air passage downstream of the heater core 103. Moreover, the baffle 145 for preventing heat pickup horizontally extends at the middle part of the warm air passage of the upper passage 141 in the vertical direction. The third guide unit 310 extends upwards from the baffle 145 for preventing heat pickup, and then, is curved toward the defrost vent 116.

Referring to FIG. 11, the extension line of the end portion of the curved part 311 is formed to face the bottom surface of the entrance of the defrost vent 116. So, warm air passing the heater core 103 is guided by the curved part 311 and is smoothly guided to the entrance of the defrost vent 116.

Furthermore, at an angle that the vent door 122 fully opens the face vent 117, the end portion of the vent door 122 meets or intersects the extension line of the end portion of the curved part 311. That is, the end portion of the main plate of the vent door 122 meets or intersects the extension line of the end portion of the curved part 311. The main plate of the vent door 122 serves as a resistive barrier of the air facing the defrost vent 116 by the curved part 311 so as to guide some of the air facing the vent door 122 toward the face vent 117. Therefore, in the vent mode that the vent door 122 opens the face vent 117, some of the air facing the defrost vent 116 is guided toward the face vent 117 so as to prevent the air volume toward the face vent 117 from lowering.

Meanwhile, the heater core 103 is fixed and supported by the support part formed on the air conditioning case 110. The heat exchanger support part 225 which supports the heater core 103 is formed integrally with the air conditioning case 110. In this instance, the fourth guide unit 320 extends integrally from the support part 25. The air guided by the third guide unit 310 and the air guided by the fourth guide unit 320 are concentrated in the same direction, so that the mixing zone is moved toward the defrost vent 116.

FIG. 13 illustrates a flow of the air in the floor mode. Referring to FIG. 13, the air passing the heater core 103 is guided by the vertical part 312 and the curved part 311 of the third guide unit 310 so that the flow direction is changed to the defrost vent 116.

Additionally, FIG. 14 illustrates a flow of the air in the mixing mode. Referring to FIG. 14, some of the air passing the evaporator 102 bypasses the heater core 103 and flows above the heater core 103. The air above the heater core 103 is guided to the left of the face vent 117, the front side of the vehicle, by the fourth guide unit 320. In addition, the other of the air passing the evaporator 102 is guided toward the defrost vent 116 by the third guide unit 310 after passing the heater core 103.

Therefore, if the third guide unit and the fourth guide unit are not disposed, the mixing zone is formed at a "C (dotted line)" part, but as described in the present invention, if the third guide unit and the fourth guide unit are disposed, the mixing zone is moved and is formed at a "D (solid line)" part. In other words, the mixing zone is moved to the left top, the top of the front side of the vehicle, by the third guide unit 310 and the fourth guide unit 320. Therefore, the mixing zone between the cold air and the warm air is fully moved toward the defrost vent 116 to improve mixing performance.

In the meantime, the fourth guide unit 320 includes a streamlined surface 321. The streamlined surface 321 is formed on the surface facing the cold air passage. The fourth guide unit 320 continuously extends from the inner wall surface of the left case to the inner wall surface of the right case in the vehicle width direction. As illustrated in FIG. 4, the extension line of the end portion of the streamlined surface 321 is formed side by side with the vent door 122 at an angle that the vent door 122 fully opens the face vent 117.

That is, the fourth guide unit 320 is formed on both sides of the separator and on the inner surfaces of both sides of the air conditioning case 110 in the vehicle width direction. The fourth guide unit of the air conditioning case and the fourth guide unit of the separator are coupled with each other, so that the fourth guide unit 320 continuously extends from the inner wall surface of the left case to the inner wall surface of the right case in the vehicle width direction. Therefore, the fourth guide unit 320 performs the function to guide the air and the function to support the left case, the right case and the separator when they are assembled, so as to improve assemblability and intensity.

The air passing the evaporator tends to move straight approximately in the horizontal direction. Because the extension line of the end portion of the streamlined surface 321 formed on the fourth guide unit 320 is formed side by side with the vent door 122, in the vent mode, the air passing the evaporator 102 is directly guided to the face vent 117 so as to increase the air volume toward the face vent 117.

In more detail, referring to FIG. 13, the third guide unit 310 is formed to be closer to the face vent 117 than an extension line (L1) of the heat exchanger support part 225. That is, the third guide unit 310 is located between the extension line (L1) of the upper heat exchanger support part 225 of the heater core 103 and the extension line (L2) of the fourth guide unit 320. Moreover, the fourth guide unit 320 extends from a temperature door seating part 228 to the upper heat exchanger support part 225. The fourth guide unit 320 is arranged above or in front of the heater core 103.

Through the above configuration, the warm air of the warm air passage can be guided smoothly toward the defrost vent 116. In this instance, because the third guide unit 310 is located between the extension line (L1) of the heat exchanger support part 225 on the upper portion of the heater core 103 and the extension line (L2) of the fourth guide unit 320, the third guide unit 310 is located above the extension line (L1) to fully perform its guide function toward the defrost vent 116, and the fourth guide unit 320 prevents a drop of the air volume by the third guide unit 310 to secure sufficient air volume in the vent mode.

Additionally, compared with the structure that the third guide unit 310 is located below the extension line (L1) of the heat exchanger support part 225 on the upper portion of the heater core 103, even though there is no additional means, such as a hot channel, the third guide unit and the fourth guide unit can sufficiently guide the air toward the defrost vent 116.

Figure 15:
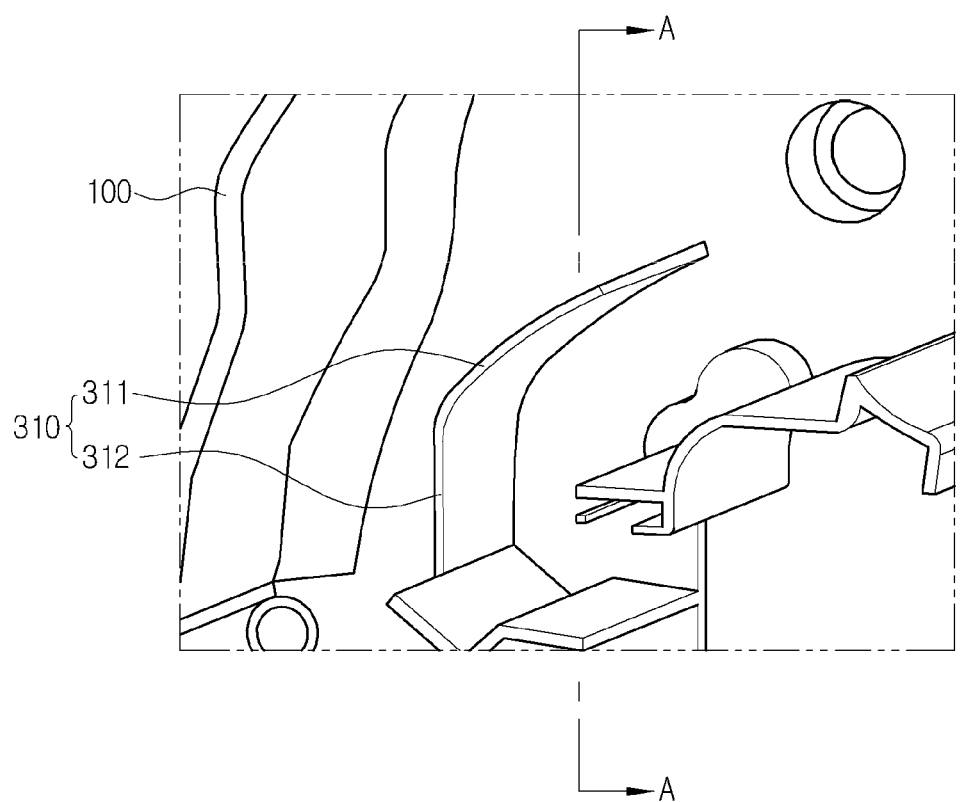
FIG. 15 is an enlarged perspective view illustrating a third guide unit and the inside of the air conditioning case according to the second preferred embodiment of the present invention.
Figure 16:
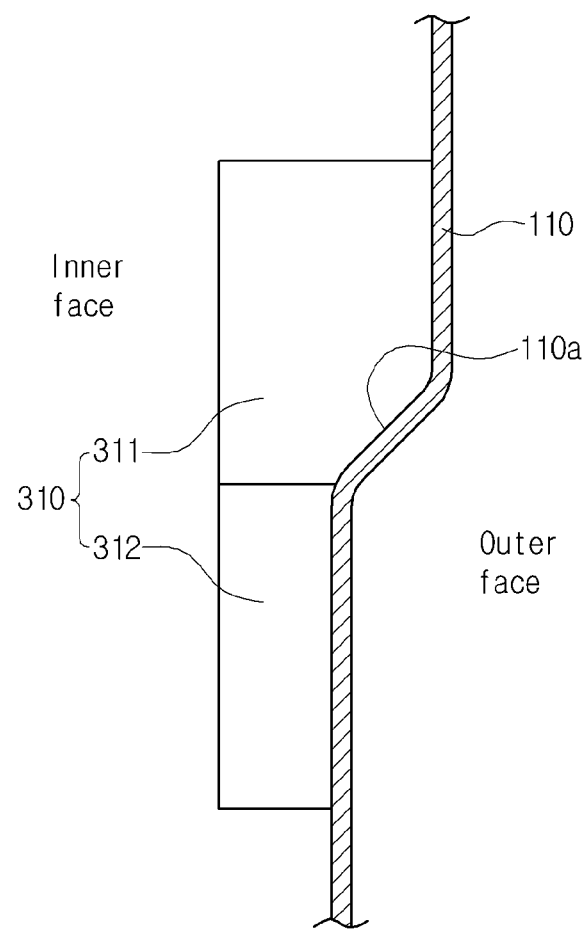
FIG. 16 is a sectional view taken along the line A-A of FIG. 15.

FIG. 15 is an enlarged perspective view illustrating a third guide unit and the inside of the air conditioning case according to the second preferred embodiment of the present invention, and FIG. 16 is a sectional view taken along the line A-A of FIG. 15.

Referring to FIGS. 15 and 16, the air conditioning case 110 has a surface rib formed on the outer face thereof. The surface rib protrudes from the outer face of the air conditioning case 110 to reinforce rigidity of the air conditioning case 110. The third guide unit 310 is formed on the inner wall surface of the air conditioning case 110 to correspond to the surface rib of the air conditioning case 110 to perform a guide function and a rigidity reinforcing function.

In more detail, at least one inclined part 110*a* is formed on the inner wall surface of the air conditioning case 110. The air conditioning case 110 protrudes in the form of the surface rib by the inclined part 110*a*. The third guide unit 310 extends in contact with the inclined part 110*a*. That is, a straight part 212 and the curved part 311 of the third guide unit 310 come into contact with the inclined part 110*a* of the air conditioning case 110 and extends inwards integrally from the air conditioning case 110.

Figure 17:
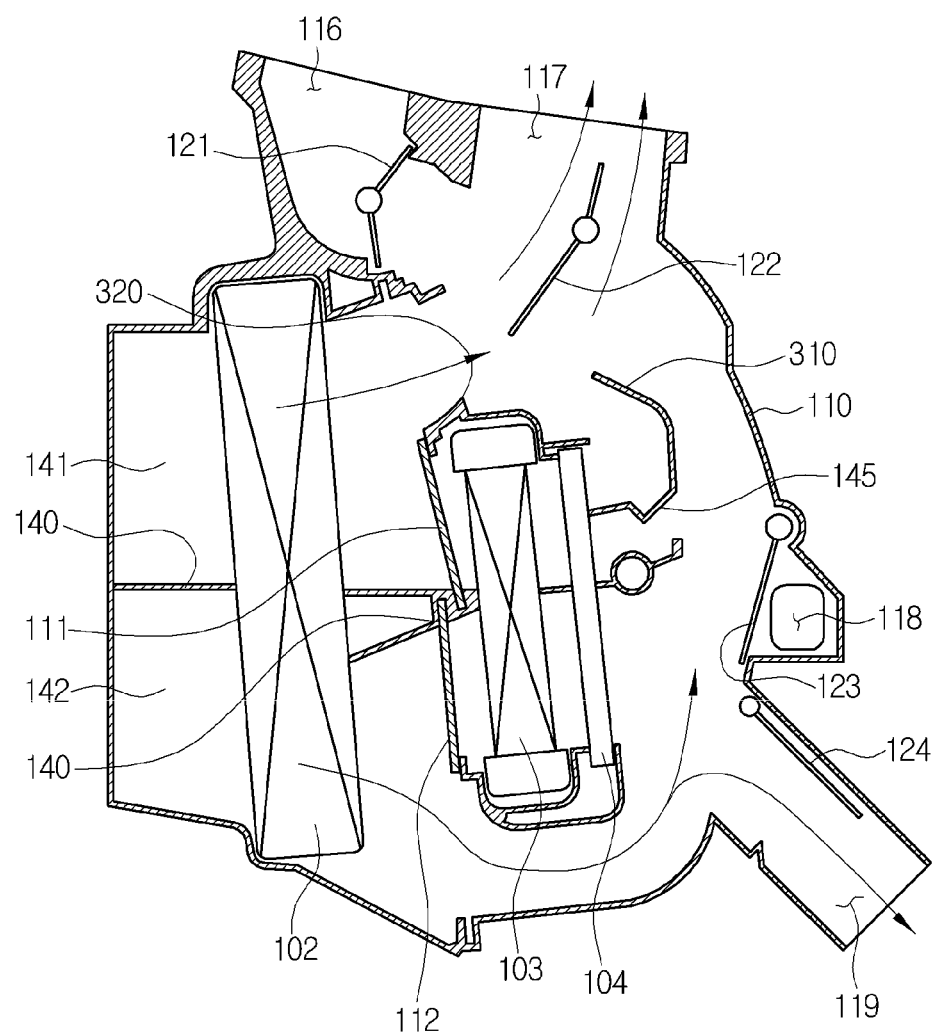
FIG. 17 is a view illustrating a vent mode of the air conditioner for a vehicle according to the second preferred embodiment of the present invention.

FIG. 17 is a view illustrating a vent mode of the air conditioner for a vehicle according to the second preferred embodiment of the present invention.

Referring to FIG. 17, in the vent mode, the first temperature door 111 and the second temperature door 112 respectively close the upper warm air passage and the lower warm air passage. Moreover, the console door 124 opens the console vent 119. The floor door 123 closes the floor vent 118. The cold air of the upper passage 141 passing the evaporator 102 bypasses the heater core 103, passes the upper cold air passage, and then, is discharged to the interior through the face vent 117. The cold air of the lower passage 142 passes the lower cold air passage, and then, is discharged to the interior through the console vent 119.

In this instance, the cold air passing the evaporator 102 is directly guided to the face vent 117 by the streamlined surface 321 of the fourth guide unit 320 to increase the air volume of the face vent 117.

Figure 18:
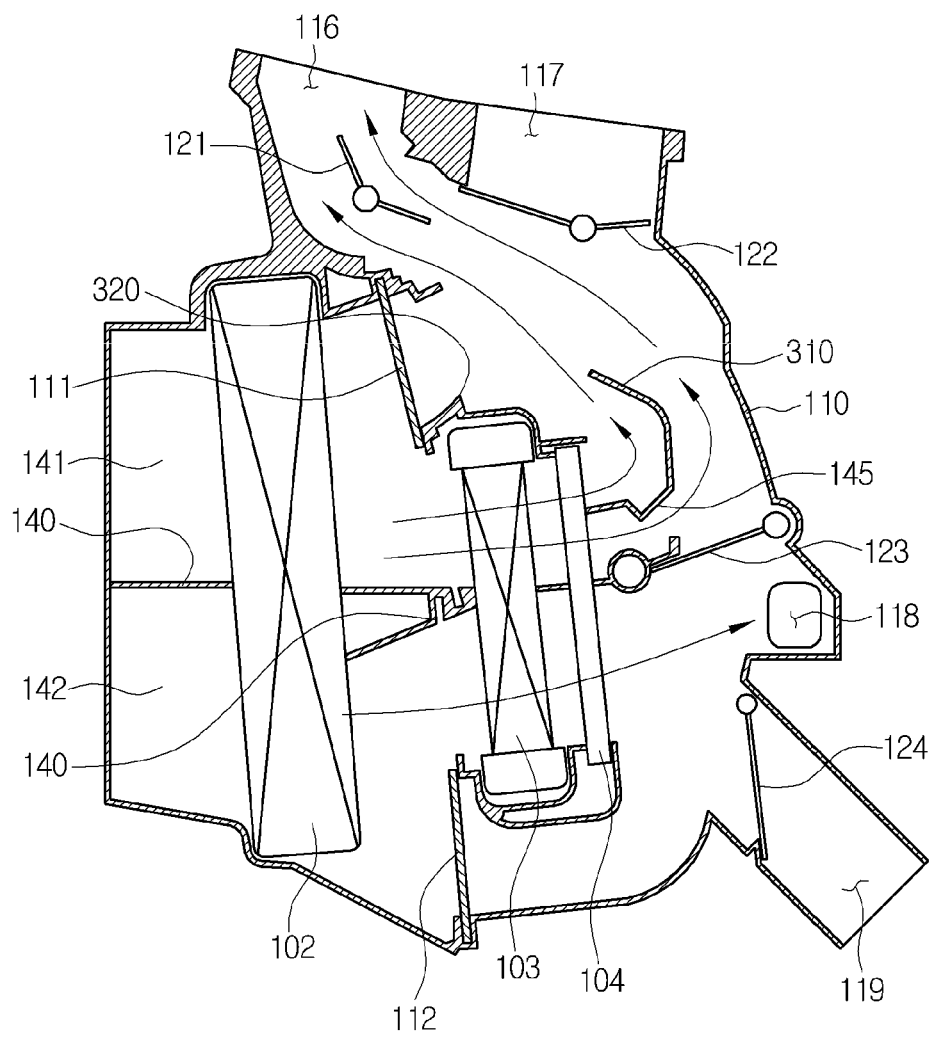
FIG. 18 is a view illustrating a floor mode of the air conditioner for a vehicle according to the second preferred embodiment of the present invention.

FIG. 18 is a view illustrating a floor mode of the air conditioner for a vehicle according to the second preferred embodiment of the present invention.

Referring to FIG. 18, in the floor mode, the first temperature door 111 and the second temperature door 112 respectively close the upper cold air passage and the lower cold air passage. Moreover, the console door 124 closes the console vent 119, and the floor door 123 opens the floor vent 118. The warm air of the upper passage 141 passing the heater core 103 after passing the evaporator 102 passes the warm air passage, and then, is discharged to the interior through the defrost vent 116. The warm air of the lower passage 142 passing the heater core 103 after passing the evaporator 102 passes the lower warm air passage, and then, is discharged to the interior through the floor vent 118.

In this instance, the warm air passing the heater core 103 is directly guided to the defrost vent 116 by the curved part 311 of the third guide unit 310 to increase discharge temperature of the defrost vent 116.

Figure 19:
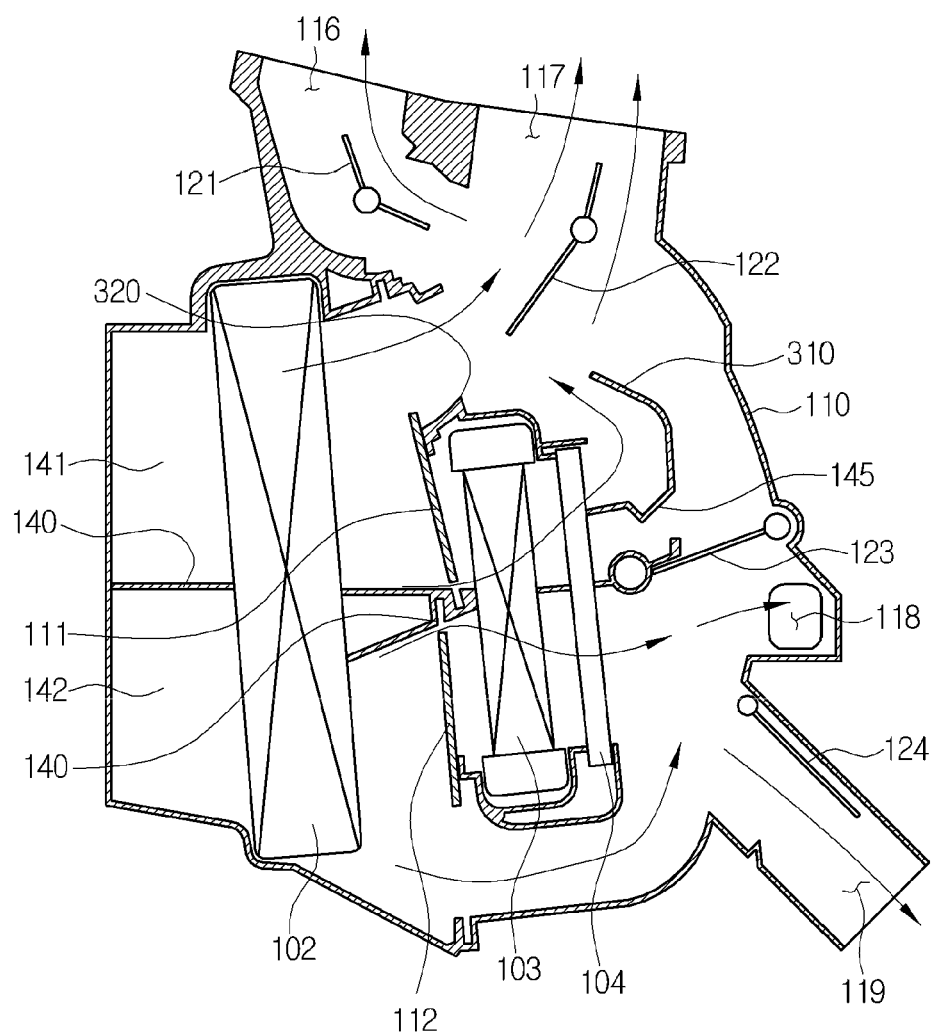
FIG. 19 is a view illustrating a mixing mode of the air conditioner for a vehicle according to the second preferred embodiment of the present invention.

FIG. 19 is a view illustrating a mixing mode of the air conditioner for a vehicle according to the second preferred embodiment of the present invention.

Referring to FIG. 19, in the mixing mode, the first temperature door 111 opens all of the upper warm air passage and the upper cold air passage, and the second temperature door 112 opens all of the lower warm air passage and the lower cold air passage. The console door 124 opens the console vent 119. The floor door 123 opens the floor vent 118.

Some of the air of the upper passage 141 passing the evaporator 102 bypasses the heater core 103 and passes the upper cold air passage. The other of the air passes the upper warm air passage after passing the heater core 103, and then, is discharged to the interior through the face vent 117 or the defrost vent 116. Some of the air of the lower passage 142 passing the evaporator 102 bypasses the heater core 103 and passes the lower cold air passage. The other of the air passes the lower warm air passage after passing the heater core 103, and then, is discharged to the interior through the floor vent 118 and the console vent 119.

In this instance, the cold air passing the evaporator 102 is directly guided to the face vent 117 by the streamlined surface 321 of the fourth guide unit 320 to increase the air volume of the face vent 117. Moreover, the warm air passing the heater core 103 is directly guided to the defrost vent 116 by the curved part 311 of the third guide unit 310 to raise discharge temperature of the defrost vent 116.

Furthermore, the mixing zone between the cold air passing the evaporator 102 and the warm air passing the heater core 103 is moved toward the defrost vent 116 so that the mixing area between the cold air and the warm air in the air conditioning case is increased, and the cold air and the warm air are not directly discharged to the face vent 117 but stay in the mixing zone for a long time so as to improve mixing performance.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. An air conditioner for a vehicle, which includes an air conditioning case having an air passage formed therein and air outlets which include a defrost vent and a face vent, and a heat exchanger for cooling and a heat exchanger for heating, which are provided in the air passage of the air conditioning case, the air conditioner comprising:
- a temperature door arranged between the heat exchanger for cooling and the heat exchanger for heating in order to adjust a degree of heating of cold air, which passed the heat exchanger for cooling, by the heat exchanger;
- a cold air passage through which cold air that passed the heat exchanger for cooling bypasses the heat exchanger for heating;
- a warm air passage through which the cold air that passed the heat exchanger for cooling passes the heat exchanger for heating;
- a cold air guide unit for guiding the cold air downstream of the heat exchanger for cooling; and
- a warm air guide unit for guiding the warm air downstream of the heat exchanger for heating;
- wherein the air passage in the air conditioning case is partitioned into an upper passage and a lower passage by a partition wall, and
- wherein the warm air guide unit changes a flow path of the air, which directs a flow path of the air toward the face vent after passing the heat exchanger for heating, to be guided to the defrost vent;
- wherein a baffle is formed downstream of the heat exchanger for heating in the warm air passage;
- wherein the warm air guide unit extends integrally from an end portion of the baffle.

2. The air conditioner according to claim 1, wherein the warm air guide unit includes a bypass part that makes a flow path of the air guided to the defrost vent bypass so that the air is directly discharged to the face vent.

3. The air conditioner according to claim 1, wherein the cold air guide unit guides the air passing the heat exchanger for cooling to the face vent, which adjoins the defrost vent, such that a mixing zone between the cold air and the warm air is located close to the defrost vent.

4. The air conditioner according to claim 1, wherein the cold air guide unit is formed along the cold air passage, wherein a vent door is configured to adjust a degree of opening of the face vent, and
- wherein an extension line of the cold air guide unit is formed in alignment with the vent door at an angle in which the vent door fully opens the face vent.

5. The air conditioner according to claim 1, further comprising:
- a vent door for adjusting a degree of opening of the face vent,
- wherein the cold air guide unit and the warm air guide unit are configured to change a point where the cold air of the cold air passage and the warm air of the warm air passage are mixed, to approach the face vent.

6. The air conditioner according to claim 5, wherein the cold air guide unit and the warm air guide unit guide air to be in a range of an opening part formed by the vent door and the face vent.

7. The air conditioner according to claim 5, wherein the air conditioning case is partitioned into an upper passage and a lower passage by a partition wall, and includes: a first temperature door disposed in the upper passage to adjust an amount of air passing the heat exchanger for heating and an amount of air bypassing the heat exchanger for heating; and a second temperature door disposed in the lower passage to adjust an amount of air passing the heat exchanger for heating and an amount of air bypassing the heat exchanger for heating, and
- wherein the cold air guide unit and the warm air guide unit guide the air toward a rotary shaft of the vent door.

8. The air conditioner according to claim 7, wherein the vent door is a center pivot type door of which both ends rotate around the rotary shaft, and
- wherein the face vent has a first opening area formed at one side based on the rotary shaft and a second opening area formed at the other side based on the rotary shaft.

9. The air conditioner according to claim 8, wherein the cold air guide unit guides the air to the first opening area, and the warm air guide unit guides the air to the second opening area.

10. The air conditioner according to claim 9, wherein the upper passage includes an upper cold air passage and an upper warm air passage, the lower passage includes a lower warm air passage and a lower cold air passage, and the upper cold air passage, the upper warm air passage, the lower warm air passage, and the lower cold air passage are formed in order from the top,
- wherein the upper passage and the lower passage communicate with each other, and
- wherein the cold air guide unit guides the air, which flows in the upper cold air passage, to the first opening area, and the warm air guide unit guides the air, which flows in at least one among the upper warm air passage, the lower warm air passage and the lower cold air passage, to the second opening area.

11. The air conditioner according to claim 8, wherein the first opening area is wider than the second opening area.

12. An air conditioner for a vehicle, which includes an air conditioning case having an air passage formed therein and air outlets which include a defrost vent and a face vent, and a heat exchanger for cooling and a heat exchanger for heating, which are provided in the air passage of the air conditioning case, the air conditioner comprising:
- a temperature door arranged between the heat exchanger for cooling and the heat exchanger for heating in order to adjust a degree of heating of cold air, which passed the heat exchanger for cooling, by the heat exchanger;
- a cold air passage through which cold air that passed the heat exchanger for cooling bypasses the heat exchanger for heating;
- a warm air passage through which the cold air that passed the heat exchanger for cooling passes the heat exchanger for heating;
- a cold air guide unit for guiding the cold air downstream of the heat exchanger for cooling;
- a warm air guide unit for guiding the warm air downstream of the heat exchanger for heating;
- a vertical part extending toward the face vent along the warm air passage downstream of the heat exchanger for heating; and
- a curved part curved toward the defrost vent from the upper end portion of the vertical part.

13. An air conditioner for a vehicle, which includes an air conditioning case having an air passage formed therein and air outlets which include a defrost vent and a face vent, and a heat exchanger for cooling and a heat exchanger for heating, which are provided in the air passage of the air conditioning case, the air conditioner comprising:
- a temperature door arranged between the heat exchanger for cooling and the heat exchanger for heating in order to adjust a degree of heating of cold air, which passed the heat exchanger for cooling, by the heat exchanger;
- a cold air passage through which cold air that passed the heat exchanger for cooling bypasses the heat exchanger for heating;

a warm air passage through which the cold air that passed the heat exchanger for cooling passes the heat exchanger for heating;

a cold air guide unit for guiding the cold air downstream of the heat exchanger for cooling;

a warm air guide unit for guiding the warm air downstream of the heat exchanger for heating;

wherein the warm air guide unit has an opening part formed in a vehicle width direction.

14. An air conditioner for a vehicle, which includes an air conditioning case having an air passage formed therein and air outlets which include a defrost vent and a face vent, and a heat exchanger for cooling and a heat exchanger for heating, which are provided in the air passage of the air conditioning case, the air conditioner comprising:

a temperature door arranged between the heat exchanger for cooling and the heat exchanger for heating in order to adjust a degree of heating of cold air, which passed the heat exchanger for cooling, by the heat exchanger;

a cold air passage through which cold air that passed the heat exchanger for cooling bypasses the heat exchanger for heating;

a warm air passage through which the cold air that passed the heat exchanger for cooling passes the heat exchanger for heating;

a cold air guide unit for guiding the cold air downstream of the heat exchanger for cooling;

a warm air guide unit for guiding the warm air downstream of the heat exchanger for heating;

wherein a surface rib for reinforcing rigidity protrudes from an outer face of the air conditioning case, and the warm air guide unit is on an inner wall surface of the air conditioning case to correspond to the surface rib of the air conditioning case so as to perform a guide function and a rigidity reinforcing function;

wherein at least one inclined part is disposed on the inner wall surface of the air conditioning case; and wherein the warm air guide unit extends in contact with the inclined part.

15. An air conditioner for a vehicle, which includes an air conditioning case having an air passage formed therein and air outlets which include a defrost vent and a face vent, and a heat exchanger for cooling and a heat exchanger for heating, which are provided in the air passage of the air conditioning case, the air conditioner comprising:

a temperature door arranged between the heat exchanger for cooling and the heat exchanger for heating in order to adjust a degree of heating of cold air, which passed the heat exchanger for cooling, by the heat exchanger;

a cold air passage through which cold air that passed the heat exchanger for cooling bypasses the heat exchanger for heating;

a warm air passage through which the cold air that passed the heat exchanger for cooling passes the heat exchanger for heating;

a cold air guide unit for guiding the cold air downstream of the heat exchanger for cooling; and a warm air guide unit for guiding the warm air downstream of the heat exchanger for heating;

wherein the warm air guide unit is formed to be closer to the face vent than an extension line of a heat exchanger support part on an upper portion of the heat exchanger for heating, wherein the warm air guide unit is located between the extension line of the heat exchanger support part on the upper portion of the heat exchanger for heating and an extension line of the cold air guide unit, and wherein the cold air guide unit extends from a temperature door seating part to the heat exchanger support part on the upper portion of the heat exchanger for heating so as to be arranged above and in front of the heat exchanger for heating.

16. An air conditioner for a vehicle, which includes an air conditioning case having an air passage formed therein and air outlets which include a defrost vent and a face vent, and a heat exchanger for cooling and a heat exchanger for heating, which are provided in the air passage of the air conditioning case, the air conditioner comprising:

a temperature door arranged between the heat exchanger for cooling and the heat exchanger for heating in order to adjust the degree of heating of cold air, which passed the heat exchanger for cooling, by the heat exchanger;

a cold air passage through which cold air that passed the heat exchanger for cooling bypasses the heat exchanger for heating;

a warm air passage through which the cold air that passed the heat exchanger for cooling passes the heat exchanger for heating;

a cold air guide unit for guiding the cold air downstream of the heat exchanger for cooling;

a warm air guide unit for guiding the warm air downstream of the heat exchanger for heating a vent door for adjusting a degree of opening of the face vent, wherein the cold air guide unit and the warm air guide unit are configured to change a point where the cold air of the cold air passage and the warm air of the warm air passage are mixed, to approach the face vent;

wherein the cold air guide unit and the warm air guide unit are formed at the top of a rear surface of the heat exchanger for heating.

\* \* \* \* \*